(12) United States Patent
Hilakari et al.

(10) Patent No.: US 10,605,154 B2
(45) Date of Patent: Mar. 31, 2020

(54) METHOD OF CLEANING A CHARGE AIR COOLER AND AN INTERNAL COMBUSTION ENGINE

(71) Applicant: WÄRTSILÄ FINLAND OY, Vaasa (FI)

(72) Inventors: Vesa Hilakari, Vaasa (FI); Juha Kujala, Lauderdale/Hollywood, FL (US); Ville-Veikko Mäkinen, Vaasa (FI); Kari Nieminen, Lauderdale/Hollywood, FL (US)

(73) Assignee: WARTSILA FINLAND OY, Vaasa (FI)

( * ) Notice: Subject to any disclaimer, the term of this patent is extended or adjusted under 35 U.S.C. 154(b) by 49 days.

(21) Appl. No.: 16/066,849

(22) PCT Filed: Dec. 30, 2015

(86) PCT No.: PCT/EP2015/081388
§ 371 (c)(1),
(2) Date: Jun. 28, 2018

(87) PCT Pub. No.: WO2017/114567
PCT Pub. Date: Jul. 6, 2017

(65) Prior Publication Data
US 2019/0017431 A1    Jan. 17, 2019

(51) Int. Cl.
*F02B 29/04* (2006.01)
*F01P 3/20* (2006.01)
(Continued)

(52) U.S. Cl.
CPC ............ *F02B 29/0468* (2013.01); *F01P 3/20* (2013.01); *F01P 11/06* (2013.01);
(Continued)

(58) Field of Classification Search
CPC .. F02B 29/04; F02B 29/0418; F02B 29/0437; F02B 29/0468; F02B 29/0412;
(Continued)

(56) References Cited

U.S. PATENT DOCUMENTS

| 5,809,981 A | 9/1998 | Berg-Sonne |
| 2007/0199320 A1* | 8/2007 | Yager ................ F02B 29/0412 60/599 |

(Continued)

FOREIGN PATENT DOCUMENTS

| DE | 10 2013 201532 A1 | 7/2014 |
| EP | 2 574 753 A1 | 4/2013 |

(Continued)

OTHER PUBLICATIONS

International Search Report (PCT/ISA/210) dated Oct. 6, 2016, by the European Patent Office as the International Searching Authority for International Application No. PCT/EP2015/081388.

(Continued)

*Primary Examiner* — Mark A Laurenzi
*Assistant Examiner* — Jessica L Kebea
(74) *Attorney, Agent, or Firm* — Buchanan Ingersoll & Rooney PC

(57) ABSTRACT

The present disclosure relates to a turbocharged internal combustion engine which will flush dirt periodically from the heat exchange surfaces of the LT-charge air cooler by using water condensed on the heat exchange surfaces for the flushing.

11 Claims, 4 Drawing Sheets

(51) Int. Cl.
*F01P 11/06* (2006.01)
*F28D 21/00* (2006.01)
*F02D 41/00* (2006.01)
*F02D 41/22* (2006.01)
*F28G 9/00* (2006.01)

(52) U.S. Cl.
CPC ...... *F02B 29/0412* (2013.01); *F02B 29/0443* (2013.01); *F02B 29/0462* (2013.01); *F02B 29/0493* (2013.01); *F02D 41/0007* (2013.01); *F02D 41/22* (2013.01); *F28G 9/00* (2013.01); *F01P 2011/065* (2013.01); *F01P 2060/02* (2013.01); *F02D 2200/0406* (2013.01); *F02D 2200/0414* (2013.01); *F02D 2200/0418* (2013.01); *F28D 2021/0082* (2013.01); *Y02T 10/144* (2013.01); *Y02T 10/146* (2013.01); *Y02T 10/40* (2013.01)

(58) Field of Classification Search
CPC ............ F02B 29/0443; F02B 29/0462; F02B 29/0493; F01P 11/06; F01P 3/20; F01P 2011/065; F01P 2060/02; F28G 9/00; F02D 41/0007; F28D 2021/0082
See application file for complete search history.

(56) References Cited

U.S. PATENT DOCUMENTS

2009/0020079 A1* 1/2009 Muller ................... F01P 7/165
123/41.1
2014/0290630 A1 10/2014 Pursifull
2015/0040874 A1* 2/2015 Isermeyer .......... B60H 1/00271
123/563
2015/0369122 A1 12/2015 Stiller
2015/0369179 A1 12/2015 Hotta
2016/0250671 A1* 9/2016 Vigild ................ F02B 29/0468
134/18
2016/0265458 A1 9/2016 Okada et al.

FOREIGN PATENT DOCUMENTS

| EP | 2 957 744 A1 | 12/2015 | |
|---|---|---|---|
| JP | 2014163336 A * | 9/2014 | ............ F02M 26/05 |
| WO | WO 2011/073512 A1 | 6/2011 | |
| WO | WO 2015/071723 A2 | 5/2015 | |
| WO | WO 2015/135685 A1 | 9/2015 | |

OTHER PUBLICATIONS

Written Opinion (PCT/ISA/237) dated Oct. 6, 2016, by the European Patent Office as the International Searching Authority for International Application No. PCT/EP2015/081388.

Notification of Transmittal of The International Preliminary Report on Patentability (Form PCT/IPEA/416) and International Preliminary Report on Patentability (PCT Article 36 and Rule 70) (Form PCT/IPEA/409) dated Nov. 23, 2017, by the European Patent Office for International Application No. PCT/EP2015/081388.

* cited by examiner

METHOD OF CLEANING A CHARGE AIR COOLER AND AN INTERNAL COMBUSTION ENGINE

TECHNICAL FIELD

The present invention relates to a method of cleaning a charge air cooler of an internal combustion engine as discussed in the preamble of claim 1 and an internal combustion engine as discussed in the preamble of claim 10.

BACKGROUND ART

Nowadays both the economic and environmental aspects guide the users of internal combustion engines to demand engines having as low specific fuel consumption as possible. Such a demand has led to the use of equipment increasing the charge of air in the engine cylinders compared to normally aspirated engines. A first piece of such equipment is generally called a supercharger whose main task is to increase the pressure or density of air, i.e. compress the air entering the engine cylinders. There are two main types of superchargers. A first one is a turbocharger, generally known as a turbo, which is a unit having, on the same shaft a turbine wheel and a compressor wheel such that the exhaust gases of the engine, by means of the turbine wheel, drive the compressor wheel, which compresses air into the cylinders. A second one is a mechanically driven supercharger, i.e. an air compressor, which is either directly or indirectly coupled to the engine crankshaft by means of a belt, a gear or a chain. A roots blower is a good example of mechanically driven superchargers. The superchargers are able to improve the specific fuel consumption of an internal combustion engine considerably, but a continuous strive to lower fuel consumption and lower emissions have led to the use of a second piece of equipment increasing the air charge. Such a piece of equipment is generally known as an intercooler, i.e. a device used for cooling the air compressed by a supercharger before the air enters the engine cylinders. In other words, a decrease in air intake temperature provides a denser intake charge to the engine and allows more air and fuel to be combusted per engine cycle, increasing the output of the engine.

There are two types of intercoolers, or Charge Air Coolers (or CAC) as the device is from now on called, used on supercharged internal combustion engines to improve their volumetric efficiency by increasing intake air charge density through cooling. A first type is an air-to-air heat exchange device where the hot compressed air is cooled by means of outside ambient air. The use of ambient air results in a simple charge air cooler arrangement but has a few downsides. Firstly, the actual engine charge is directly proportional to the temperature of the ambient air, i.e. the higher is the outside temperature the smaller is the charge and vice versa. Secondly, the positioning of the engine, for instance in marine installations, requires considerable amount of ducting to lead the outside air to the charge air cooler. To avoid the above drawbacks, a second type of charge air cooler is an air-to-liquid heat exchange device where a specific cooling liquid circuit is arranged to be used in connection with the charge air cooler. The cooling liquid circuit includes means for keeping the temperature of the cooling liquid substantially constant irrespective of the ambient air temperature, whereby the air charge to the cylinders does not change as a function of the outside temperature. Thereby the engine's performance characteristics are the same irrespective of the geographical location of the engine. It is normal practice to use engine cooling liquid as the cooling liquid for the charge air, too. Thereby, the charge air cooling arrangement needs only one heat exchange device and some piping to operate properly, as the cooling liquid circuit for the engine coolant already comprises one or more heat exchange devices and thermostats.

However, it is quite clear that by using the engine cooling liquid the temperature of which is of the order of 90-100 degrees Celsius (° C.) the charge air temperature cannot be reduced but to a level of 100+° C. For example, if the charge air pressure is 4-4.5 bar, the temperature of the charge air after the compressor is some 170-190° C., whereby the temperature may be reduced by about 60-70° C. To be able to lower the charge air temperature further another cooling liquid circuit, so called low temperature (LT) cooling liquid circuit is often provided. In such a case the above discussed cooling liquid circuit utilizing hot engine cooling liquid is called a high temperature (HT) cooling liquid circuit. The low temperature cooling liquid circuit includes another air-to-liquid heat exchange device by means of which the temperature of the charge air may, preferably, be reduced to a value as low as possible, i.e. close to its dew point, which is, naturally, dependent on the humidity of the air. Heat exchange to such a low temperature requires the use of specific heat exchange arrangement in the low temperature cooling liquid circuit, where, for instance, outside air or water (from sea, lake or river) is used as the cooling medium.

It is well known in prior art to aim at keeping the temperature of the charge air as well as the heat exchange surfaces of the charge air cooler above the dew point of the charge air to prevent water from condensing on the heat exchange surfaces of the charge air cooler. If the charge air temperature is reduced below the dew point water condenses from the charge air. As an example of the generation of condensate on the heat exchange surfaces of the charge air cooler the following may be presented. At an ambient air temperature of 35° C. and a relative humidity of 80%, the content of water in the air is 0.029 kg water/1 kg dry air. If the air manifold pressure (charge air receiver pressure) under these conditions is 2.5 bar (=3.5 bar absolute), the dew point will be 55° C. If the air temperature in the air manifold is only 45° C., the air can only contain 0.018 kg water/1 kg dry air. The difference, 0.011 kg/kg (0.029–0.018) will appear as condensed water.

The condensed water is apt to cause both corrosion in the charge air system and inlet valves, and, at its worst, engine damage. The condensation of water may be fought by preventing the generation of the condensate, i.e. by following the pressure, humidity and temperature of the charge air and controlling the temperature and/or volume flow of the cooling liquid to such a level that the heat exchange surfaces of the charge air cooler stay at a temperature above the dew point and condensation does not occur. If, however, condensate is, for some reason, formed, additional problems related thereto may be avoided by providing the charge air cooler with means for draining the condensate out of the cooler.

For instance US-A1-2014290630 discusses methods and systems provided for draining condensate from a charge air cooler during a compressor bypass valve event. In one example, an engine controller may open a drain valve in the charge air cooler in response to potential compressor surge conditions. Opening the drain valve may be further based on an amount of condensate in the charge air cooler and a required decrease in pressure at an outlet of the compressor during the compressor bypass valve event.

A problem that requires periodical servicing of the charge air cooler is related to keeping the heat exchange surfaces of the charge air cooler clean such that the heat exchange capability of the heat exchange surfaces is not reduced. The intake air of an internal combustion engine contains always, in spite of the suction air filter upstream of the compressor, small particulates that tend to adhere gradually to all heat exchange surfaces they get into contact with. The small particulates may be fine sand, dust, exhaust gas particulates etc. that have passed the suction filter.

The prior art solution to the problem is either to clean the heat exchange surfaces manually, to use ultrasound or to arrange spray nozzles by means of which jets of cleaning fluid may be sprayed more or less automatically against the heat exchange surfaces. Such ways of cleaning have to be performed periodically, either in connection with ordinary servicing of the engine, or when the engine is running at low load.

The reduction in heat exchange capacity means, in practice, need for increased circulation of cooling liquid and somewhat more difficult control of the charge air temperature.

BRIEF SUMMARY OF THE INVENTION

Thus, an object of the present invention is to raise the state of the art in the area of charge air coolers of an internal combustion engine by providing a method of cleaning the heat exchange surfaces of the cooler while running the engine.

Another more detailed object of the present invention is to present a method of cleaning the heat exchange surfaces of the charge air cooler automatically.

At least some of the above and other objects of the present invention are reached by a method of cleaning a charge air cooler of a turbocharged internal combustion engine, the engine comprising
  at least one cylinder,
  at least one cylinder head,
  an exhaust manifold arranged in connection with the at least one cylinder head,
  a charge air receiver arranged in connection with the at least one cylinder head,
  at least one turbocharger with a turbine connected to the exhaust gas manifold and a compressor connected to the charge air receiver,
  a high temperature (HT-) charge air cooler and a low temperature (LT-) charge air cooler arranged between the compressor and the charge air receiver, the charge air coolers having heat exchange surfaces,
  the LT-charge air cooler being a part of an LT-cooling liquid circuit comprising, in addition to the LT-charge air cooler at least a central cooler and a circulating pump,
  a control unit for controlling the temperature of the charge air in relation to its dew point, the control unit receiving information on the temperature, pressure and humidity of the charge air,
  the method comprising the steps of:
  flushing dirt periodically from the heat exchange surfaces of the LT-charge air cooler by reducing the temperature of the heat exchange surfaces of the LT-charge air cooler below the dew point of the charge air for allowing the water to condense on the heat exchange surfaces,
  allowing the water to condense.

Other characteristic features of the present invention become evident from the appended dependent claims and the following description of the preferred embodiments of the present invention.

By applying the present invention at least some of the following advantages are gained:
  the heat exchange surfaces of the charge air cooler are kept cleaner than before, whereby the controllability of the operation of the charge air cooler is more accurate than before and the need for pumping the cooling liquid through the charge air cooler is reduced.

BRIEF DESCRIPTION OF DRAWING

In the following, the prior art and the present invention is discussed in more detail by referring to the appended drawings, of which

DETAILED DESCRIPTION OF DRAWINGS

Figure 1:
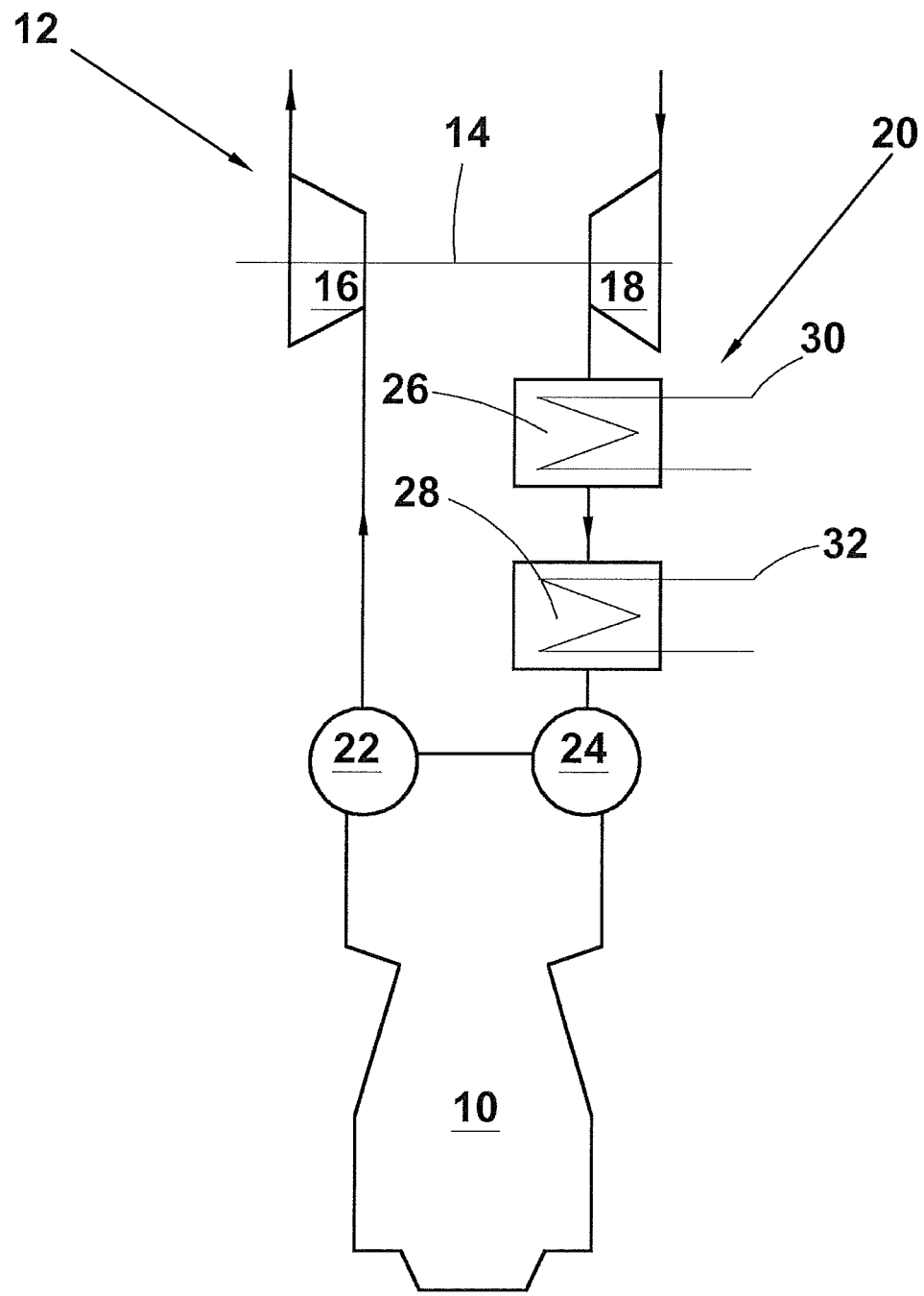
FIG. 1 illustrates schematically a prior art turbocharged internal combustion engine having two charge air coolers between the turbocharger compressor and the engine.

FIG. 1 discusses a prior art internal combustion engine 10 comprising a cylinder block with at least one cylinder and at least one cylinder head and having at least one turbocharger 12 with a shaft 14, a turbine 16 and a compressor 18, and an intercooler arrangement 20 between the compressor 18 and the engine 10. The turbine 16 of the turbocharger 12 is in communication with the exhaust gas manifold 22 at the cylinder head of the engine 10 and the compressor 18 with the charge air receiver 24 at the cylinder head of the engine 10. The intercooler arrangement 20 comprises two charge air coolers provided with heat exchange surfaces, i.e. a high-temperature (HT) charge air cooler 26 with HT-heat exchange surfaces and a low-temperature (LT) charge air cooler 28 with LT-heat exchange surfaces, the charge air coolers being arranged such that the charge air leaving the compressor 18 is first introduced in the HT-charge air cooler 26 and thereafter to the LT-charge air cooler 28. The HT- and LT-charge air coolers are parts of an HT-cooling liquid circuit 30 and an LT-cooling liquid circuit 32, respectively.

Figure 2:
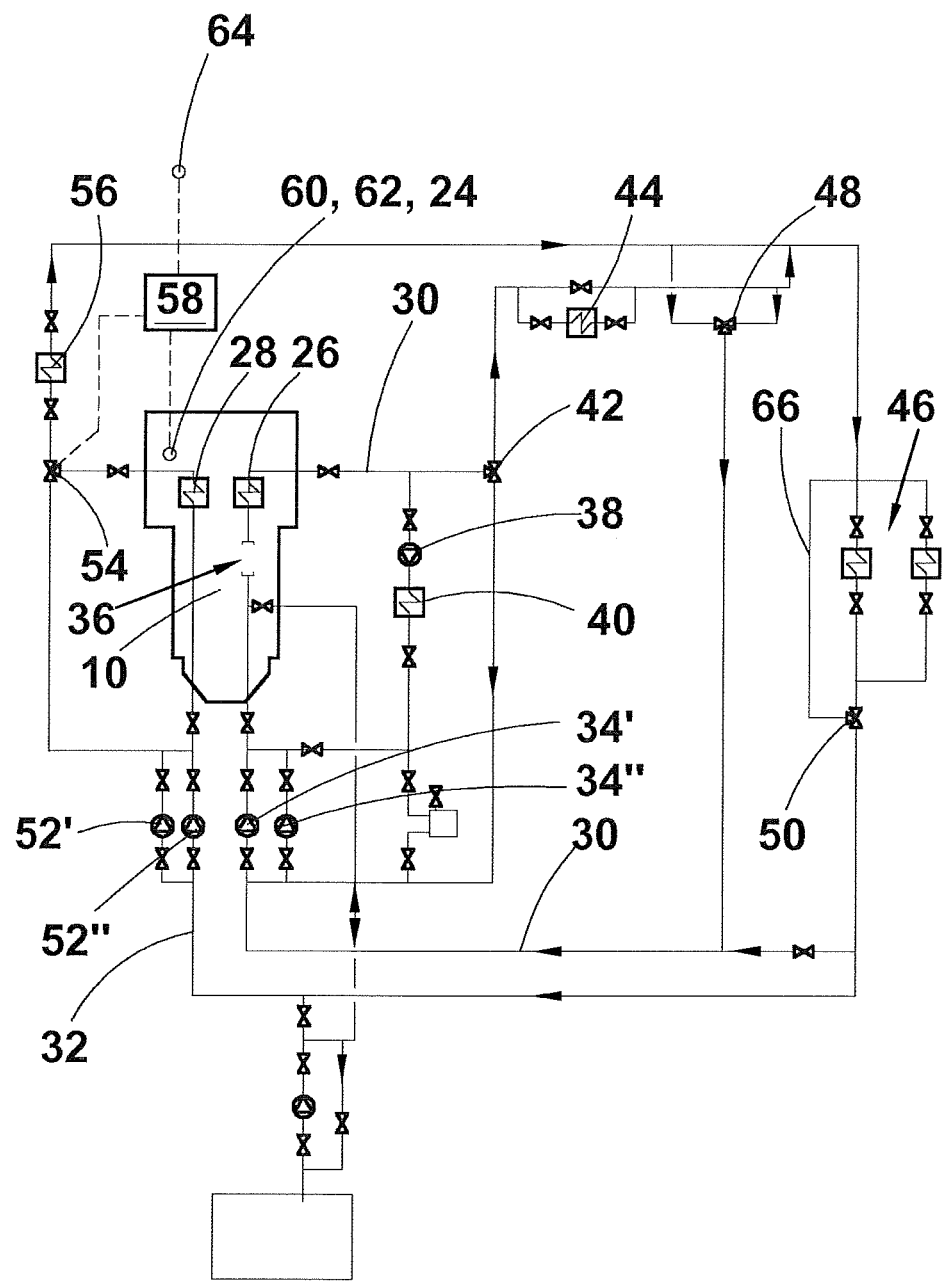
FIG. 2 illustrates schematically a first preferred embodiment of the cooling circuits relating to a turbocharged internal combustion engine having two charge air coolers.

FIG. 2 illustrates schematically a first preferred embodiment of such a cooling liquid system of an internal combustion engine 10 that may be applied in the method of the present invention. The cooling liquid system comprises, as discussed in connection with FIG. 1, a high-temperature (HT) cooling liquid circuit 30 and a low-temperature (LT) cooling liquid circuit 32. The inlet of the HT-charge air cooler 26 is connected in series with the cooling liquid channels of the engine 10 such that it receives the cooling liquid from the engine 10.

The HT-cooling liquid circuit 30 of the engine 10 comprises a varying number of components depending on the temperature of the cooling liquid. In all its possible variations the HT-cooling liquid circuit 30 comprises a HT-liquid circulation pump 34' and an optional stand-by pump 34" arranged in parallel therewith, the cooling channels 36 in the cylinder block and cylinder head/s of the engine, the HT-charge air cooler 26 and a return flow passage. The circulation pump 34' may be driven either electrically or hydraulically, or it may be a built-on pump, i.e. mechanically connected to the engine crankshaft by means of a gear, chain or belt. The optional stand-by pump 34" is driven either hydraulically or electrically. The HT-cooling liquid circuit 30 has a few basic operating or running modes. The first one, while the engine and the cooling liquid are warming up, comprises, in addition to the HT-liquid circulation pump 34' or an optional stand-by pump 34", the cooling liquid channels 36 of the engine 10 and the HT-charge air cooler 26, a preheating pump 38 and a preheater 40 (operating with steam or electricity). In case the engine is provided with a built-on circulating pump and warmed up without running the engine, the stand-by pump 34" is used for circulating the liquid. This running mode or this kind of a short HT-cooling liquid circuit 30 is used to speed up the warming up of the cooling liquid and the engine by preheating the cooling liquid. In a second running mode, i.e. while the cooling liquid has reached a predetermined temperature (about 60° C.) a three-way valve 42 starts opening and allows a part of the cooling liquid collected from the engine 10 and the HT-charge air cooler 26 to flow down to the circulation pump 34' or the stand-by pump 34" by-passing the preheater 40. In a third running mode, while the cooling liquid has reached a certain predetermined temperature (for instance about 91° C.), i.e. the running temperature of the engine, the three-way valve 42 starts guiding the flow of cooling liquid from the engine 10 and the HT-charge air cooler 26 towards two optional flow paths where the cooling liquid is cooled either by means of a heat exchanger 44 recovering heat from the cooling liquid or by means of a central cooler 46 where the cooling liquid is cooled, for instance, by means of ambient air or water from sea, lake or river. After the heat exchanger 44 the cooling liquid may be arranged to by-pass the central cooler 46 by means of a three-way valve 48 and a by-pass duct 66 that may guide a part or all of the cooling liquid towards the circulation pump 34' to be pumped back to the cooling channels 36 of the engine 10. The central cooler 46 is arranged to cool the cooling liquid down to a desired temperature (for instance about 38° C.) with the help of a three-way valve 50. The three-way valve 50 is used for controlling the temperature of the cooling liquid by choosing from where and how much liquid is allowed to pass the valve 50. Thus, the balance of cooling liquid flows collected, on the one hand, from the central cooler 46 and, on the other hand, from the by-pass duct 66 is adjusted by means of the three-way valve 50. In other words, the three-way valve 50 may receive cooling liquid from one or both of the central cooler 46 and the by-pass duct 66. Thereby, the more cool cooling liquid is needed the more cooling liquid is taken from the central cooler 46, and vice versa.

The LT-cooling liquid circuit 32 includes in this embodiment, in addition to the LT-charge air cooler 28, an LT-recirculation pump 52' and an optional LT-stand-by pump 52", a three-way valve 54, lubricating oil cooler 56 (optional) and the central cooler 46. Sometimes also a gear oil cooler (not shown) is arranged in the same cooling liquid circuit. Additionally, the LT-cooling liquid circuit 32 comprises a control unit 58 or a computer that is connected to a temperature sensor (or transmitter) 60 and a pressure sensor (or transmitter) 62 indicating the temperature and pressure of the charge air in the charge air receiver 24 and to a sensor (or transmitter) 64 indicating the humidity of the charge air. The control unit 58 may be a stand-alone independent device, but it may as well form a part of a general control arrangement of the engine.

The LT-cooling liquid circuit 32 functions normally such that cooling liquid from the central cooler 46 is pumped by means of the LT-circulating pump 52' or the LT-stand-by pump 52" towards both the LT-charge air cooler 28 and the three-way valve 54. The three-way valve 54 receives its control signal or command from the control unit 58, which, for keeping the charge air temperature the desired one above the dew point of the charge air, controls the flow of LT-cooling liquid through the LT-charge air cooler 28. In other words, if the charge air temperature should be increased (for instance to avoid condensing of the water) some more cooling liquid is allowed to by-pass the LT-charge air cooler 28 (i.e. to flow directly from the circulation pump 52' or the stand-by pump 52" to the three-way valve 54) via the three-way valve 54 back towards the central cooler 46. In an opposite case, i.e. when the charge air temperature should be lowered the three-way valve 54 allows more cooling liquid flow through the LT-charge air cooler 28. Thus, the charge air temperature is controlled by letting a part of the LT-cooling liquid by-pass the charge air cooler 28 at low load. Thus, the control unit 58, based on the information it receives from the pressure, temperature and humidity sensors/transmitters of the charge air, sends commands to the three-way valve 54 provided on the outlet side of the LT-charge air cooler 28. With this arrangement the charge air temperature can be kept at a desired and constant level irrespective of variations in the engine load or LT-liquid temperature, thus minimizing the amount of condensate water or totally preventing the formation thereof in, for instance, tropical conditions (depending on the safety or security margins provided in the control unit).

In principle all the above discussed instrumentation, control and circuitry is known from prior art. It is also known, and well documented, that the most advanced ways of controlling the charge air temperature take into account the charge air humidity so that the charge air temperature, as well as that of the heat exchange surfaces of the LT-charge air cooler, may be kept just above the dew point. In other words, the state of the art control system aims, on the one hand, at keeping the charge air temperature as low as possible for maximal engine efficiency, and on the other hand, the temperature of the heat exchange surfaces of the LT-charge air cooler at a level high enough for preventing water from condensing from the charge air on the heat exchange surfaces of the charge air cooler.

However, as the fouling of the heat exchange surfaces of the charge air cooler is a clear problem, which is shown either as a reduced heat exchange capability, as an increased need for pumping the LT-cooling liquid or as an increased need for service (compared to other service needs) a way to keep the heat exchange surfaces of charge air coolers clean during ordinary use of the engine have been searched for. A new way of cleaning or flushing the heat exchange surfaces taken into consideration in this invention is using the condensate as the cleaning medium. However, it does, by no means, mean that the temperature of the charge air or the heat exchange surfaces of the charge air cooler would be kept continuously below the dew point, but only periodically. Extensive testing has shown that the risk of corrosion is greatly reduced if the heat exchange surfaces of the charge air cooler are kept dry for most of the time and allowed to get wet at certain intervals.

The basic idea of the present invention is to allow water to condense on the heat exchange surfaces of the LT-charge air cooler to such an extent that a water film flows down along the heat exchange surfaces and flushes dirt particles adhered to the heat exchange surfaces so that the dirt is discharged together with the condensed water from the charge air cooler. This kind of function is contrary to accidental condensing of water on the heat exchange surfaces of the charge air cooler, which usually takes place, for instance, when the humidity of the charge air changes unexpectedly such that the dew point is raised above the prevailing charge air temperature or that of the heat exchange surfaces of the charge air cooler and results in the heat exchange surfaces of the charge air cooler only getting damp, which only facilitates the adherence of dirt particles on the heat exchange surfaces. In other words, the condensation, in accordance with a first preferred embodiment of the present invention, is controlled by the control unit 58, which is configured to sending periodically commands to the three-way valve 54 to throttle the direct communication from the circulating pump 52' to the central cooler 46 so that the flow of cooling liquid from the central cooler 46 and the circulating pump 52' is forced to pass the LT-charge air cooler 28 such that the temperature of the heat exchange surfaces of the LT-charge air cooler is temporarily reduced at least a few degrees below the dew point of the charge air for allowing the water to condense on the heat exchange surfaces. Naturally, the higher is the difference between the temperature of the heat exchange surfaces and the dew point, the more efficient is the condensing of water from the humid air flow. In accordance with a further preferred embodiment of the present invention the control unit 58 sends a command to the three-way valve 54 to open the three-way valve 54 such that all LT-cooling medium flows via the LT-charge air cooler 28, whereby the condensation in the LT-charge air cooler is at its maximum.

Figure 3:
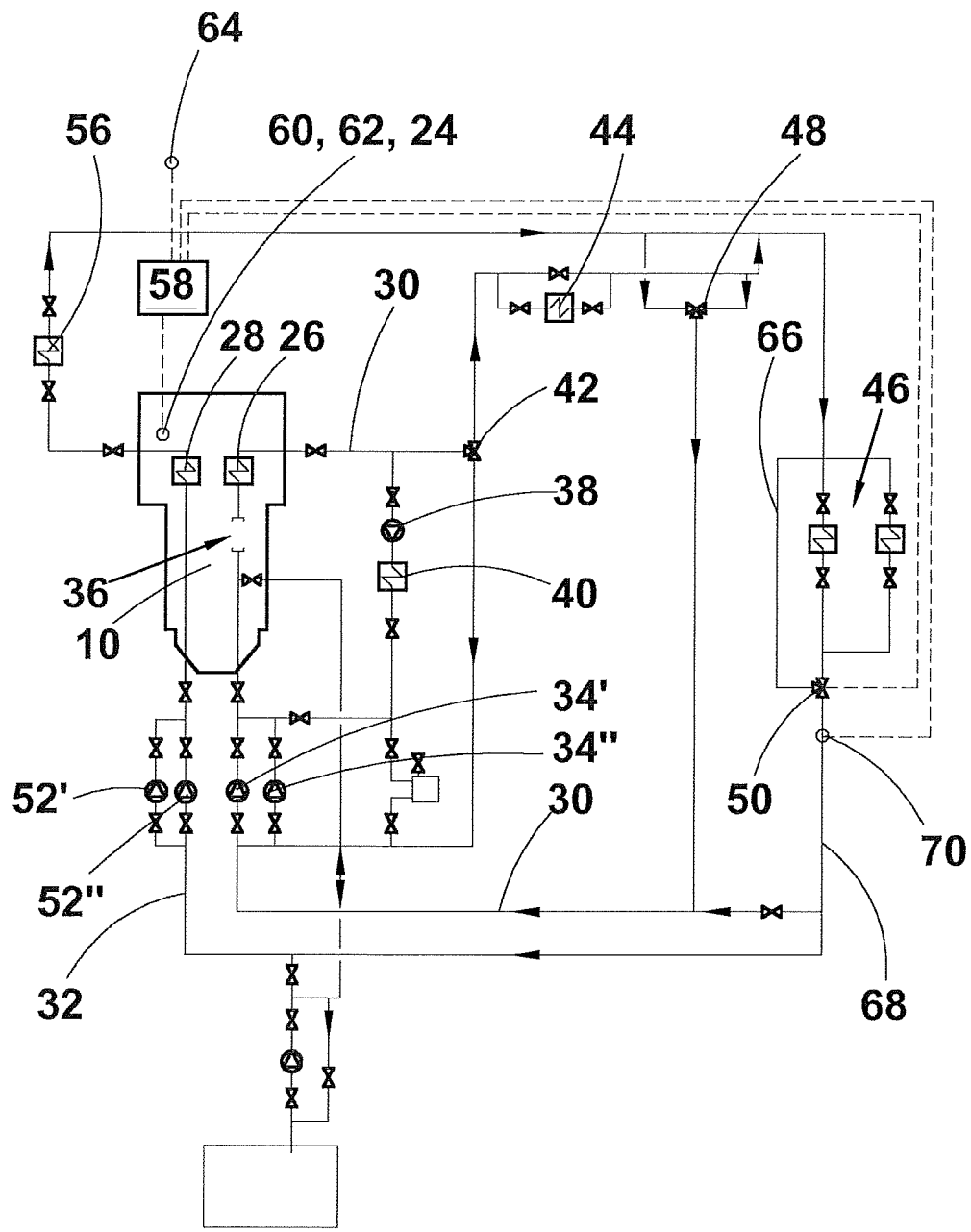
FIG. 3 illustrates schematically a second preferred embodiment of the cooling circuits relating to a turbocharged internal combustion engine having two charge air coolers.

FIG. 3 illustrates schematically a second preferred embodiment of such a cooling liquid system of an internal combustion engine 10 that may be applied in the method of the present invention. For the most part the cooling circuits 30 and 32 are similar with the first embodiment discussed in connection with FIG. 2. The only exception here is that the control unit 58 does not send control commands to a three-way valve after the LT-charge air cooler 28 (as such is not needed) but is, in accordance with the second preferred embodiment of the present invention, configured to sending periodically commands to the three-way valve 50 downstream of the central cooler 46 or to the circulating pump 52', 52". In other words, the control unit follows the temperature (sensor/transmitter 60), pressure (sensor/transmitter 62) and humidity (sensor/transmitter 64) of the charge air, just like earlier, but now controls the operation of the LT-charge air cooler 28 by adjusting the temperature or the volume flow of the cooling liquid flowing from the central cooler 46 via the circulation pump 52' to the LT-charge air cooler 28.

The temperature control of the cooling liquid may be performed in at least three different ways either alone or in combination. A simple way is to maintain the temperature of the charge air the desired one by changing the setting of the three-way valve 50 as a function of the charge air temperature. In other words, if the charge air temperature should be lowered the control unit 58 sends a command to the three-way valve 50 to throttle the flow via the central cooler by-pass duct 66 and allow more cooled liquid from the central cooler 46 to enter the duct 68 leading to the circulating pump 52'. In an opposite case the three-way valve 50 is commanded to change the flow balance in the opposite direction, i.e. to reduce the flow of cooled liquid from the central cooler 46 and increase the flow from the by-pass duct 66. When applying this embodiment in the flushing phase of the present invention the control unit may command the three-way valve 50 to open direct communication from the central cooler 46 to duct 68, i.e. preventing any cooling liquid from by-passing the central cooler 46 via duct 66. Thereby the cooling liquid is as cold as it may get by means of the central cooler 46.

Another slightly more complicated way to control the temperature of the cooling liquid is to use sensor/transmitter 70 that measures the temperature of the cooling liquid downstream of the three-way valve 50. The temperature sensor/-transmitter 70 may also be used when applying this embodiment in the flushing phase of the present invention. The control unit 58 may be programmed to recognize, when following the cooling liquid temperature at 70, a situation where the temperature is not low enough for an efficient flushing. In such a case the control unit may send a command to the central cooler 46 to take into use another heat exchanger (shown in FIG. 3 parallel with the main heat exchanger), whereby the temperature of the cooling liquid exiting the central cooler 46 may still be reduced.

A third way to control the temperature of the cooling liquid is to use sensor/transmitter 60 that measures the temperature of the charge air. The temperature sensor/-transmitter 60 may also be used when applying this embodiment in the flushing phase of the present invention. The control unit 58 may be programmed to recognize, when following the charge air temperature at 60, a situation where the temperature is not low enough for an efficient flushing. In such a case the control unit 58 may send a command to the circulating pump 52', 52" to increase the volume flow of the cooling liquid from the central cooler 46 to the LT-cooler 28.

Figure 4:
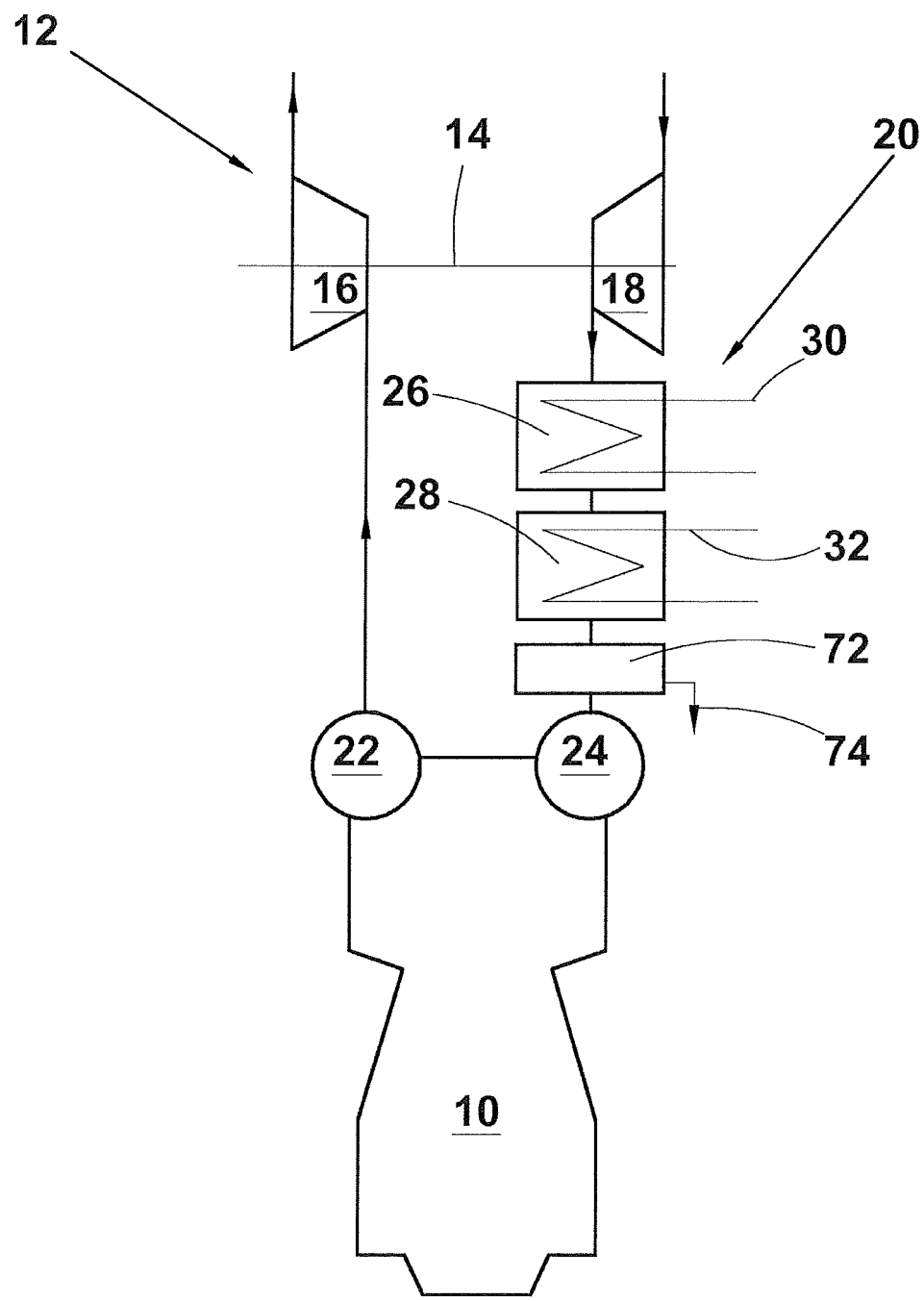
FIG. 4 illustrates schematically a turbocharged internal combustion engine in accordance with a third preferred embodiment of the present invention, i.e. an engine having two charge air coolers and a mist catcher between the turbocharger compressor and the engine.

FIG. 4 illustrates schematically a turbocharged internal combustion engine in accordance with a third preferred embodiment of the present invention, i.e. an engine 10 having two charge air coolers 26, 28 and a mist catcher 72 between the turbocharger compressor 18 and the charge air receiver 24 of the engine 10. In other words, the internal combustion engine 10 of the present invention is provided with a mist catcher, i.e. a droplet separator 72 between the HT-charge air cooler 28 and the charge air receiver 24. The purpose of the mist catcher 72 is to catch all water droplets after the cleaning step of the LT-charge air cooler 32 so that the droplets are not carried with the charge air to the engine 10. The condensed water is drained automatically via a discharge valve 74 from the mist catcher 72. The discharge of the condensed water may be based on water level in the tank of the mist catcher or the discharge may be performed after each, or every second or third cleaning stage, just to name a few exemplary options.

Performed experiments in various environments including both marine engines in marine vessels and engines used for power generation on land have shown that flushing with condensate for a period of 2-20 minutes, preferably 5-10 minutes for every 200-500 hours of operation is sufficient for maintaining the heat exchange capability of a charge air cooler on an acceptable good level. In other words, for most of the time the control unit 58 follows the dew point of the charge air and maintains the charge air temperature and that of the heat exchange surfaces of the charge air cooler slightly above the dew point, and for only a fraction of the time guides the charge air temperature and that of the heat exchange surfaces of the charge air cooler below the dew point. Preferably, the heavy condensing stage is performed, preferably, but not necessarily, at a high engine load, as, in such a situation, the volume flow and velocity of humid air is higher and more water may be condensed from the air resulting in more efficient flushing of the LT-charge air cooler surfaces and more efficient removal of the condensed water from the LT-charge air cooler to the mist catcher.

As to the above exemplary embodiments discussing a single in-line engine, the present invention may, naturally, be applied to several engines both in-line engines and V-type engines. For instance, both the HT- and the LT-cooling circuits may be arranged to utilize the central cooler or the heat recovery common to all engines. In other words, cooling liquid for all the engines is taken from the central-cooler and divided into the engines arranged in parallel. The same applies to the heat recovery, i.e. the cooling liquid from the heat recovery is taken from the exchanger and divided into the engines arranged in parallel.

In view of the above it should also be understood that the cooling liquid system comprises a number of other valves, of which only a part is shown on the appended drawings. In a similar manner the cooling liquid system may comprise other equipment that may or may not have an influence on the working of the invention. However, the drawings have to be understood as exemplary illustrations of the environment the present invention is used. The description of the invention has concentrated on such elements of the cooling liquid system that are needed for making the invention work.

The invention claimed is:

1. A method of cleaning a charge air cooler of a turbocharged internal combustion engine, the engine having:
   a cylinder block with at least one cylinder;
   at least one cylinder head;
   an exhaust manifold arranged in connection with the at least one cylinder head;
   a charge air receiver arranged in connection with the at least one cylinder head;
   at least one turbocharger with a turbine connected to the exhaust gas manifold and a compressor connected to the charge air receiver;
   a high temperature (HT-) charge air cooler and a low temperature (LT-) charge air cooler arranged between the compressor and the charge air receiver, the HT- and LT-charge air coolers each having heat exchange surfaces;
   the LT-charge air cooler being a part of an LT-cooling liquid circuit having, in addition to the LT-charge air cooler, at least a central cooler and a circulating pump;
   a control unit for controlling a temperature of charge air in relation to a dew point of the charge air, the control unit receiving information on the temperature, a pressure and a humidity of the charge air; and
   a first three-way valve provided in the LT-cooling liquid circuit downstream of the LT-charge air cooler, the first three-way valve being configured for receiving commands from the control unit to direct a flow of a cooling liquid from the circulating pump to the central cooler either directly or via the LT-charge air cooler,
   the method comprising:
      periodically commanding the first three-way valve to a first position which directs the flow of the cooling fluid from the circulating pump to the central cooler via the LT-charge air cooler, reducing a temperature of the heat exchange surfaces of the LT-charge air cooler below the dew point of the charge air by forcing an amount of the cooling liquid to flow from the central cooler via the circulating pump to the LT-charge air cooler when the first three-way valve is in the first position;
      allowing water to condense from the charge air on the heat exchange surfaces of the LT-charge air cooler;
      flushing dirt periodically from the heat exchange surfaces of the LT-charge air cooler by the condensed water; and
      discharging the condensed water from the LT-charge air cooler.

2. The method as recited in claim 1, comprising:
   closing via a second position of the first three-way valve, fluid communication from the circulating pump to the central cooler via the LT-charge air cooler and forcing a flow of cooling liquid from the central cooler via the circulating pump to bypass the LT-charge air cooler.

3. The method as recited in claim 1, comprising:
   providing the LT-cooling liquid circuit with a second three-way valve arranged downstream of the central cooler and providing the second three-way valve with commands from the control unit to control a temperature of the cooling liquid from the central cooler via the circulating pump to the LT-charge air cooler.

4. The method as recited in claim 3, comprising:
   controlling the cooling liquid temperature by adjusting, via the second three-way valve, an amount of cooling liquid flowing from the central cooler to a by-pass duct.

5. The method as recited in claim 1, comprising:
   providing the circulating pump with a command from the control unit to adjust a volume flow in relation to the temperature of the charge air.

6. The method as recited in claim 1, comprising:
   providing a mist catcher between the LT-charge air cooler and the charge air receiver for preventing water droplets from entering the at least one cylinder.

7. The method as recited in claim 1, wherein the periodically flushing dirt from the heat exchange surfaces of the LT-charge air cooler is performed after every 200-500 hours of engine operation.

8. A turbocharged internal combustion engine, comprising:
   a cylinder block with at least one cylinder;
   at least one cylinder head;
   an exhaust manifold arranged in connection with the at least one cylinder head;
   a charge air receiver arranged in connection with the at least one cylinder head;
   at least one turbocharger with a turbine connected to the exhaust manifold and a compressor connected to the charge air receiver;
   a high temperature (HT-) charge air cooler and a low temperature (LT-) charge air cooler arranged between the compressor and the charge air receiver, the HT- and LT-charge air coolers each having heat exchange surfaces;
   the LT-charge air cooler being a part of an LT-cooling liquid circuit having, in addition to the LT-charge air cooler, at least a central cooler and a circulating pump;
   a control unit for controlling a temperature of the charge air in relation to a dew point of the charge air, the control unit being configured for receiving information on the temperature, a pressure and a humidity of the charge air; and
   a first three-way valve provided in the LT-cooling liquid circuit downstream of the LT-charge air cooler, the first three-way valve being configured for receiving commands from the control unit to direct a flow of a cooling liquid from the circulating pump to the central cooler either directly or via the LT-charge air cooler;

wherein the control unit is configured for periodically commanding the first three-way valve to a first position which directs the flow of the cooling fluid from the circulating pump to the central cooler via the LT-charge air cooler, for reducing a temperature of the heat exchange surfaces of the LT-charge air cooler below a dew point of charge air by allowing water to condense on the heat exchange surfaces for a predetermined time period, by forcing an amount of the cooling liquid to flow from the central cooler via the circulating pump to the LT-charge air cooler when the first three-way valve is in the first position.

9. The turbocharged internal combustion engine as recited in claim 8, comprising:

a second three-way valve arranged downstream of the central cooler for receiving commands from the control unit to control a flow of the cooling liquid from the central cooler via the circulating pump to the LT-charge air cooler.

10. The turbocharged internal combustion engine as recited in claim 8, wherein the circulating pump is configured for receiving commands from the control unit to control a volume flow of cooling liquid to the LT-charge air cooler.

11. The turbocharged internal combustion engine as recited in claim 8, comprising:

a mist catcher between the LT-charge air cooler and the charge air receiver.

* * * * *